Figure 3:
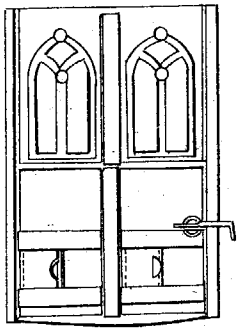

D. G. LITTLEFIELD.

Magazine Stove.

No. { 133 / 1,237 }

Reissued Nov. 19, 1861.

Witnesses.

G. Buck

J. Brannen

Inventor.

Dennis G. Littlefield by G. Daniel Speed his Atty

N. PETERS, PHOTO-LITHOGRAPHER, WASHINGTON, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861.

DIVISION No. 2.

*To all whom it may concern:*

Be it known that I, DENNIS G. LITTLEFIELD, of the city and county of Albany, and State of New York, have invented a new and useful Improvement in Base-Burning Stoves; and I do hereby declare that the following is a full and exact description thereof, reference being had to the accompanying drawings, and to the letters of reference marked thereon.

Stoves for burning "anthracite," "mineral," or "fossil" coal have been contrived in which a reservoir for the coals has been applied immediately over the fire-pot in such a position that as the fuel is consumed the fuel in the reservoir descends to supply the place of that consumed. In such a case the ignition has taken place entirely within the fire-pot, which in no case has been so perforated as to properly permit the flame to pass into another chamber surrounding the fire-pot, where the unconsumed gases might be ignited in contact with the partially-burned coal, and the consequence has been that a large portion of the gases produced have passed off unconsumed, causing a great waste of fuel, while the partially-consumed coals from which the more volatile and inflammable portions have been expelled, when they reach the interior surface of the pot or sides of the fire-box, are soon cooled and extinguished, the current of air which makes its way up through the fire being insufficient to keep the combustion to a point that would consume all the cinders and more refractory portions of the coal, unless the fire were rushed, when other inconveniences result, such as the formation of clinkers and the destruction of the fire-pot, the stove in such case requiring frequently to be cleaned out to rid it of these clinkers and unconsumed coals. On this account it has been found impracticable in any stove heretofore constructed, whether with or without a reservoir for fuel, to maintain the fire for a considerable length of time without the necessity of clearing it out, as before mentioned.

It is furthermore well known that the perfect and entire combustion of anthracite, mineral, or fossil coal can only be effected by causing the hydrogen of the coal as well as the various products of imperfect combustion—such as carbureted hydrogen and carbonic oxide—to ignite in immediate contact with the solid portions or partially-consumed coals from which the gases have been expelled, the two, as it were, helping to consume each other. To effect this simultaneous combustion of the waste gases with the carbon of the coals is the object of my invention, which consists in the employment of a grated fire-pot with no solid or unperforated sides against which the partially-consumed coals can rest and cool, which grated fire-pot is surmounted by a reservoir for the reception of the gases which arise from the burning of the fresh coal. As this reservoir, which serves also to contain a supply of fuel, is closed at the top, the only escape for the gases which it collects is through the grated fire pot at a point where the solid, unconsumed coal is in a state of ignition. These gases are thus inflamed, and by the heat thus produced aid in the combustion of the partially-consumed coals which always and under the most favorable circumstances burn with much more reluctance than the fresh coal, as their most inflammable elements have already been dissipated. By carefully collecting these gases in the manner above described, and igniting them in immediate contact with the unconsumed portions of the coals, I am enabled entirely to consume the latter at the same time that the otherwise waste gases are economized, and the fuel is consequently entirely utilized, the ashes falling from the grate at the bottom, free from cinders and clinkers. This latter peculiarity of my stove—viz., the entire freedom from clinkers—is believed to be due to the fact that the hottest part of the fire is upon the exterior all around the grated fire-pot, as this is the point where the gases are most thoroughly burned, and not, as in all other stoves with which I am acquainted, in the center of the mass. The heat is thus kept all through the fire-pot at a height sufficient to promote constant combustion. In stoves as heretofore constructed, however, the heat accumulates in the center of the fire, while at the sides, where it comes in contact with the surface of the fire-pot, the coals are cooled so rapidly that they are soon extinguished, and the consequence is a great amount of cinder, which renders it necessary frequently to clean out the stove and start the fire afresh.

Base-burning stoves and furnaces for burning anthracite, mineral, or fossil coal have also been heretofore so constructed that air finds admission into the upper part of the supply or fuel chamber above the fuel which is not (as yet) ignited. Air thus admitted is liable to form, with the gases that accumulate in said chamber, an explosive mixture; and when the supply of the air through the grate at the base of the stove is cut off, wholly or in part, the air then entering the said supply-chamber at its top, and uniting with the carbon of the coals, will cause the whole mass of reserve fuel in said supply-chamber to ignite and be consumed therein, instead of the consumption of the coals being confined, as it should be, at or near the base of the supply-chamber, and between the bottom of said chamber and the grate at the base of the stove. To prevent the formation of such explosive mixtures, and the improper or premature ignition of such coals within the coal-supply chamber is also one object of my invention.

My invention also has for its object the use of an illuminated exterior wall of the stove, in connection with an open-sided fire-chamber and an intermediate gas consuming chamber.

To enable others skilled in the art to make and use my invention, I will proceed to describe its construction and operation.

A is the base of the stove, immediately above which is the ash-pit B.

Figure 4:
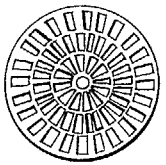
Figure 1:
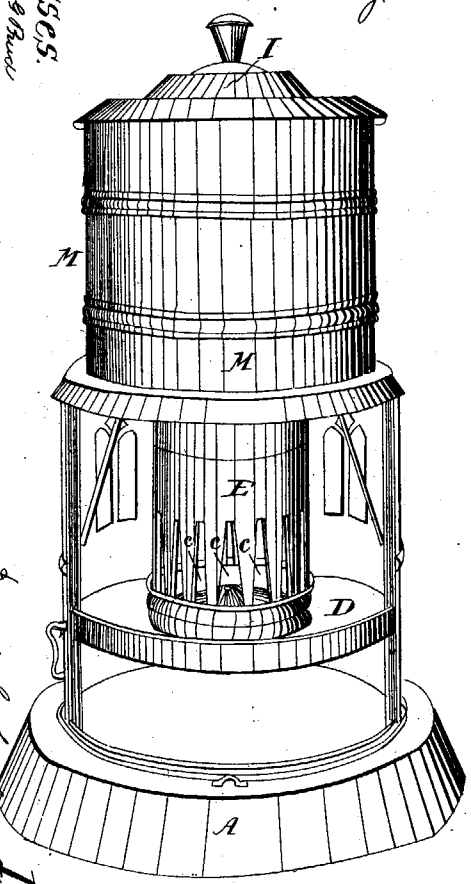

D is the bed-plate, having a cylindrical opening in its center, over which is placed a grate, C. (Shown in plan view by Fig. 4.) This grate C is superimpended by a coal supply chamber or reservoir, F, the lower portion of which reservoir is so constructed as to form a suitable fire-pot, E, to contain the incandescent coal. The said fire-pot E is open-sided, and practically forms a vertical grate, having its bars *b* of a peculiar shape, they being wider at the top than at the bottom, so that the spaces *c* between them are widest at the bottom. This form of the bars of the open-sided fire-pot is highly important to the successful operation of my stove represented by Figures 1 and 2, as the flame of the burning gases is thrown thereby much lower than would be the case if the spaces *c* were widest at the top; and the hottest part of the fire is thus always tending toward the bottom of the openings or spaces *c*, and outward toward the exterior of the mass of coal within the said vertical grate, which is the reverse of what ordinarily takes place.

The height of the openings or spaces *c* regulates the height of the incandescent coal in the fire-pot, the reason of this being that the gases of the coal-supply chamber do not ignite until they come in contact with the draft of air in the fire-pot, and this draft rises no higher within the fire-pot than the height of said openings.

The main object of the reservoir or coal-supply chamber F is to afford a receptacle for the waste and unconsumed gases which are thrown off during the first ignition of the anthracite, mineral, or fossil coal; and which gases, in stoves as at present constructed, pass off through the smoke-flues unconsumed. This reservoir also serves for the purpose of a magazine or receptacle for the fuel, where it is desired to feed the fire but once in twenty-four or forty-eight hours, and may be enlarged to contain a supply of coal for a much longer period.

M is the outer wall or cylinder of my stove, and may be of any convenient form. This outer wall is provided with a close-fitting cover, I. It is also provided, near its top at one of its sides, with a draft-flue or exit-pipe, K, for the passage of the smoke and spent gases out of the stove into a chimney-flue, or into a space exterior to the room in which the stove is situated.

G′ is a smoke and spent-gas chamber, connecting with the exit-pipe K, and surrounds the top and sides of the coal-supply chamber F, so that a body of heated air and heated spent gases filling this chamber G′ and constantly passing out at the pipe K is as constantly interposed between the cover I of the outer wall, M, and the cover H of the coal-supply reservoir F. Thus the entrance of air into the reservoir F is effectually prevented, since K being a main draft-pipe, any cold air which might enter the outer wall, M, under the cover I, and penetrate beneath the cover H of the reservoir F is constantly resisted from so entering the mass of coal in the reservoir F by the direct action of the draft into the pipe K, as well as by the heated strata of air and spent gases in said chamber G′.

Figure 2:
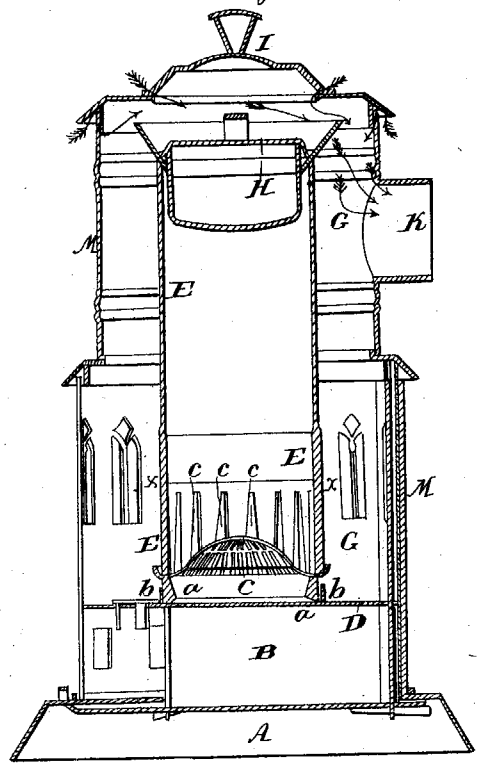

The action of the draft through the pipe K upon any air entering beneath the cover or through any openings of the wall M in the vicinity of the top of the reservoir F is illustrated by the red arrows in Fig. 2 of the drawings.

Since, then, when the stove is in operation no air can enter the reservoir F, no explosive mixtures can form therein, and all danger of the ignition and consumption of the coal in the body of the said reservoir above the fire-pot is also obviated.

G, is a fire-chamber in which the gases are burned which issue through the openings *c* of the fire-pot E. This fire-chamber is provided with openings *f* upon every side, which, like those in the doors of the stove, are glazed with isinglass, stone, or mica, and thus the stove when in operation presents the cheerful appearance of an open fire, a large sheet of flame issuing constantly from between the bars *b* of the fire-pot. This fire chamber G connects with the smoke and spent-gas chamber G′, the chamber G′ being, in fact, a continuation of the chamber G, but of less diameter, no gas being burned therein, and having no glazed sides or openings *f*.

The operation of my stove is as follows: The fire is kindled within the fire-pot E, the reservoir is filled with coal, and the cover I is closed. The cover H may be left open a short time until the fire is kindled, to prevent smoking the isinglass, stone, or mica in the sides of the stove. It is then also closed. As the combustion continues, the fuel sinks down, all within the fire-pot below the top of the openings *c* being fully ignited, having parted with its more inflammable portions while subjected to the heat of the fire immediately above the top of the said spaces. At this point—about the line *x x* of Fig. 2—the coal is fully ignited, although the consumption is very slow until in descending it reaches the top of the spaces *c*, when it begins to consume freely the gases and products of imperfect combustion which were collected within the chamber and fire-pot, and now being poured out through the spaces in the pot in an ignited state aid in the combustion of the remaining portions of the fuel, which, as before stated, always burn reluctantly unless subjected to a great draft, and are easily extinguished when allowed to rest against the unperforated sides of an ordinary fire-pot. The incandescent coal and the burning of the gases within the chamber G not only create great heat near the base of the stove, but also light up the chamber G, and, in connection with the glazed windows and doors of the outer wall, M, give the stove the cheerful appearance of an open fire. The gases and products of imperfect combustion, having been consumed in the fire-chamber G, then pass off, in a spent state up into the chamber G′, and thence, through the main-draft flue or exit-pipe K, into a flue or space exterior to the room in which the stove is situated.

Having thus fully described my invention, what I claim as new, and desire to secure by Letters Patent of the United States under this my division patent, is—

1. The vertical wedge-shape passages between the grate-bars of the fire-pot, substantially as described.

2. The employment of a grated fire-pot forming a downward continuation of a coal-supply pot, in combination with a gas-consuming chamber or flue between the outer case and the connected fire and coal supply pot, and the externally an discharging spent-gas pipe, substantially as and for the purpose set forth.

3. An illuminated exterior wall, M, in combination with a coal-supply chamber and an intermediate gas-consuming chamber, substantially as described.

DENNIS G. LITTLEFIELD.

Witnesses:

THOMAS HASTINGS,

ROBERT G. HENDRIE.